Dec. 18, 1928. 1,695,973
H. A. OLSSON
ADJUSTABLE CORNER BAR FOR PLATE GLASS WINDOWS
Filed May 9, 1927  2 Sheets-Sheet 2
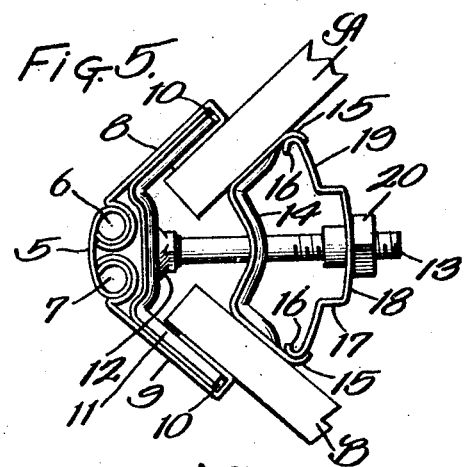
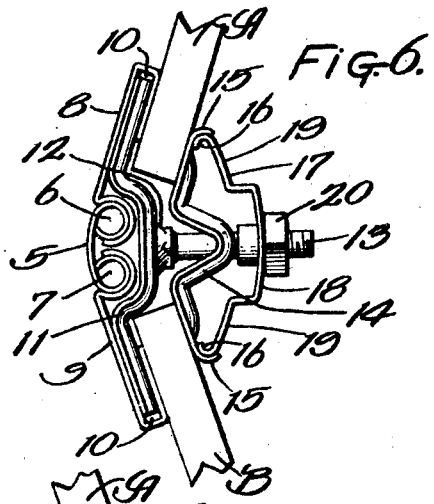
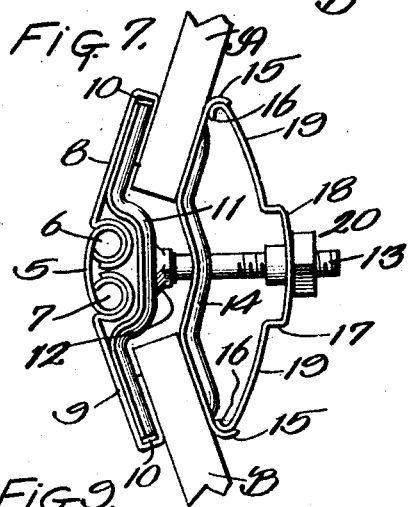
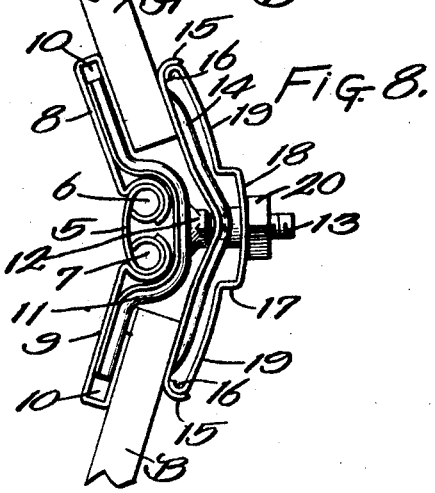
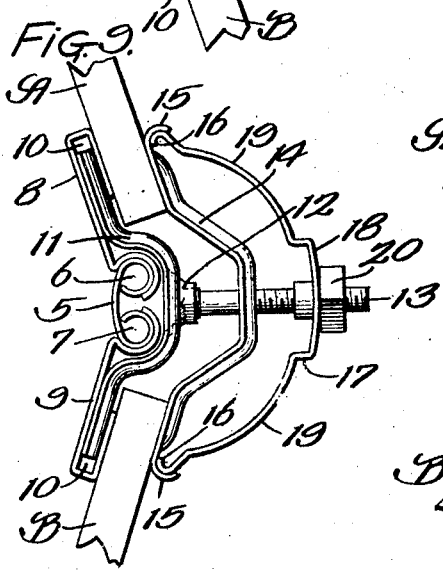
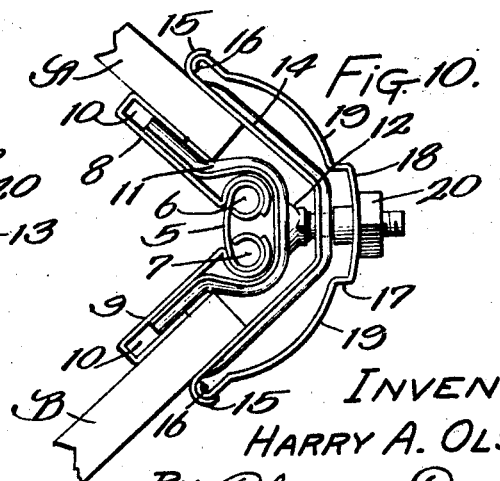
INVENTOR
HARRY A. OLSSON
BY Cheever + Cox ATTY'S Patented Dec. 18, 1928.

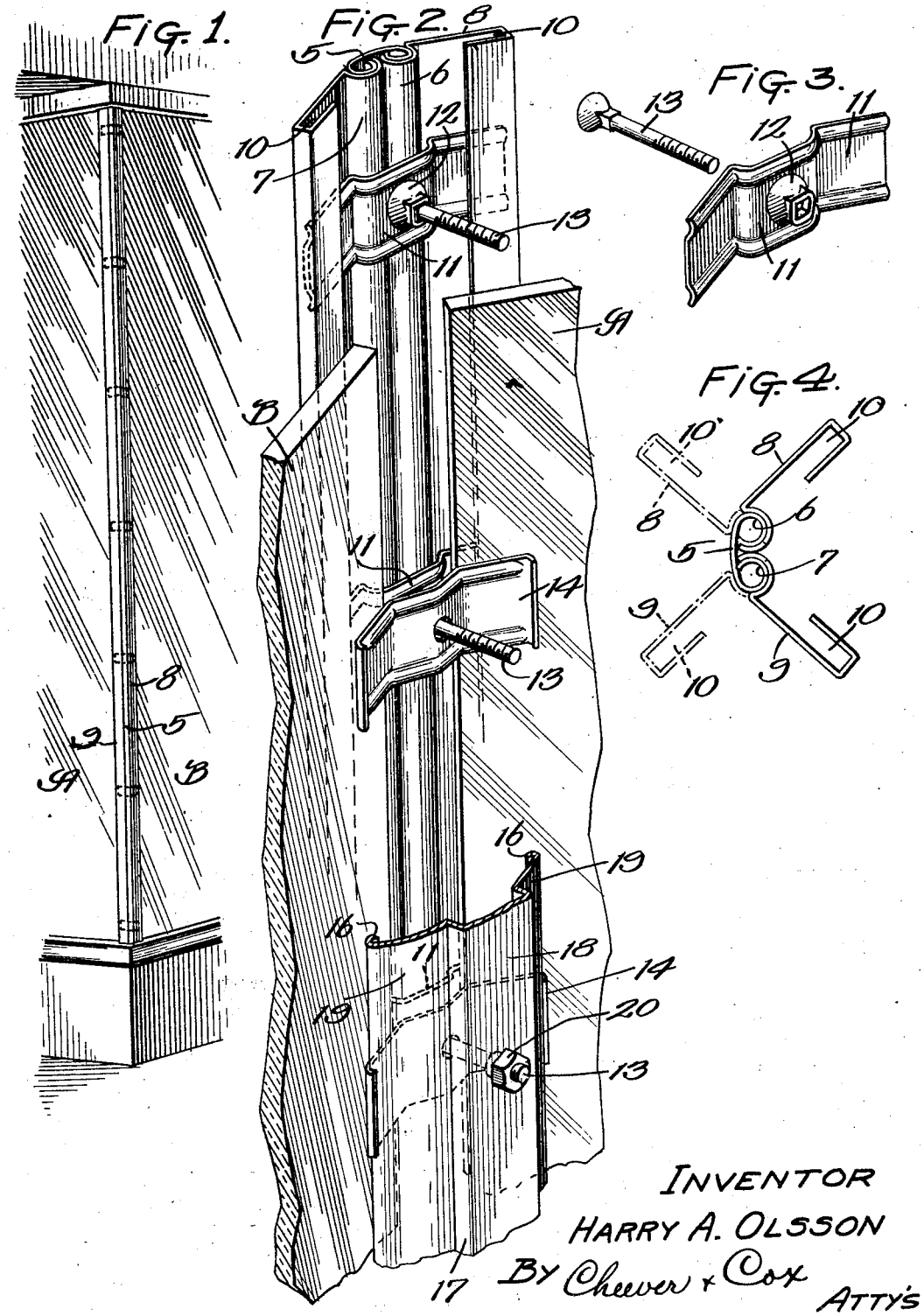

1,695,973

UNITED STATES PATENT OFFICE.

HARRY A. OLSSON, OF CHICAGO, ILLINOIS.

ADJUSTABLE CORNER BAR FOR PLATE-GLASS WINDOWS.

Application filed May 9, 1927. Serial No. 189,769.

In the installation of plate glass windows in store fronts the adjacent ends of the glass panes, at the corners for instance, are joined by what is generally referred to as corner bars. My present invention pertains to a similar construction but distinguishes from heretofore employed devices of this character in several important particulars. To begin with I have devised an adjustable device in which the assembled parts thereof are capable of accommodating the glass panes so that they may be joined one with another at practically any angle. The purpose of this adjustability is to permit the glass panes to be mounted in various designs of store fronts without specially made corner bars.

Another feature of the invention resides in a construction and cooperative relationship of parts which provides a corner bar that is unusually convenient to install.

Another feature resides in a construction which develops a decided cushioning effect for the glass; which enables a tight waterproof joint to be made and at the same time allows the joints to compensate for wind pressure to which the glass may be subjected.

With these and still other objects in view the salient features of the invention will be described with reference to the illustrative embodiments shown in the accompanying drawings. In said drawings—

Figure 1 is a view in perspective of a corner of a store front illustrating the application of my invention.

Figure 2 is an enlarged detail view in perspective showing the construction and assembly of the parts of my improved corner bar construction.

Figure 3 is a detail perspective view of the drawplate and the screw or bolt carried thereby which serves as a tension member.

Figure 4 is a detail view looking down at the end of the center strip and its hingedly connected wing strips.

Figure 5 is a view looking down at the top of the assembly showing the parts thereof in position to join the panes at one angle.

Figure 6 is a similar view showing the same parts joining the panes at another angle.

Figures 7 to 10, inclusive, are all views similar to Figures 5 and 6, that is to say, looking down at the top of the assembly, but showing the wide range of angles at which it is possible to join the glass panes with one and the same general assembly of parts.

Referring to the drawings in detail, A and B represents two glass panes to be joined which in the case of store fronts will usually be relatively wide and elongated plates. The principal purpose of my so called adjustable corner bar is to join these panes at corners or other deflected localities so that not only will the panes be securely locked together but so as to also leave as much of the transparent area of the window exposed as possible. In this way a very neat and attractive appearance is given the store front and the vision through the glass into all parts of the show window is unobstructed.

Having these objects in view I prefer to provide a center strip 5 on the street side of the window. This strip may be made in any lengths suitable for the purpose preferably extending from top to bottom of the glass panes. It may be formed from sheet metal such as copper with its opposite longitudinal edges conformed to provide two parallel curled bead-like tubular members 6 and 7. These beads in some cases will be pinched, so to speak, into abutting relation along the back of the strip's face. In other cases, particularly where the glass panes project outwardly relatively of the street side the bead like tubular members 6 and 7 will be slightly spaced apart, at least after the parts have been assembled (see Figs. 8, 9 and 10). Hingedly joined to the center strip 5 and projecting from opposite sides thereof are a pair of wing strips. The inside edge of these wing strips are conformed to correspond with the bead like tubular members 6 and 7 and embrace the same so as to provide a hinge or the like connection with the center strip. These wing strips may also be produced from sheet metal suitable for the purpose, copper being preferred.

The metal of the outer longitudinal edges of the wing strips 8 and 9 is formed to leave a channel or recess on each wing as at 10.

11 represents a draw plate, a plurality of such plates being used in spaced relation in each assembly and each plate preferably comprising a relatively stiff strip like part cut from sheet metal having outwardly extending ends made to seat in the channels 10 of the wing strip 8 and 9. The intermediate portion of these draw plates is formed to straddle the bead like tubular members 6 and 7 when the ends thereof are confined in the channels 10.

Centrally formed on this intermediate portion of each draw plate is a boss 12 providing a counter-sink for the head of a bolt 13 which projects through the boss and between the spaced ends of the glass panes A and B. The draw plates should be properly reinforced by longitudinal ribs so as not to be bent too easily. To prevent the bolts from turning in the draw plates I use a bolt with a squared portion adjacent the head thereof and square the bores in the bosses 12 to fit the square portions on the bolts.

The above parts of the assembly are preferably presented on the street side of the window with the bolts as stated projecting between the panes into the room side.

14 represents a backing plate made somewhat like the draw plates 11. The backing plates each have a central opening for the reception of the bolts 13 and in this way are spaced at intervals immediately behind the draw plates 11.

The outwardly projecting ends of the back plates are turned out as lips or curved flanges 15 to interlock with similar turned lips or flanges 16 along the longitudinal edges of the arched bracing strips 17. The bracing strip 17 is yieldable so that it may be compressed longitudinally and snapped into interlocking engagement with the backing plates. The spreading effect after thus interlocking will retain the engagement under tension.

The bracing strip 17 may be made from sheet metal, preferably copper and suitably conformed to include a relatively wide longitudinal rib portion 18 and curved wing portions 19. Holes are arranged in the rib 18 at intervals to register with the bolts 13 and nuts 20 on the bolts are employed for locking the parts together. The nuts 20 having tubular sleeves which in some cases bear against the backing plates 14.

In assembling the corner bar it will be most convenient to insert the bolts in the draw plates 11 and then slide the plates in the channels 10 of the wings 8 and 9. The bead like tubular members 6 and 7 will prevent the bolts from becoming dislodged so that this part of the device may be presented intact on the street side of the window. The backing plates 11 may be then placed on the bolts and lined up to receive the arched bracing strip. As another possibility the backing plates may be snapped in place on the arched bracing strip and after aligning their respective bolt opening the plates and brace may be presented to the room side of the assembly over the bolts 13. The nuts may then be used for tightening up the parts.

My purpose in showing Figures 5 to 10, inclusive, is to clearly bring out most of the possible angles that may be satisfied with one and the same assembly. Considering the figures consecutively, Fig. 5 shows an extreme street side angle or corner and Fig. 10 an extreme room side angle or corner. For practical reasons I would much prefer to make slight changes in the dimensions of the parts for different severe angles. As an example the same size parts may be used for any corner between and including the angles shown in Figs. 5 and 6.

Where there is any likelihood that the device will be used for reverse or street side angles, as shown in Figs. 8 to 10, inclusive, I would expect to enlarge the arched bracing strip 17 to spread over a wider area. This is also true in respect to the backing plates.

Different corner angles will also call for modified shapes in the backing plates 14, the draw plates 11 and the arched bracing strip 17. Any such modifications will be for the most part a matter of degree and will in no way disturb the general features and inherent characteristics of the assembly.

The backing plates 14 not only back up the glass and cause the latter to make a close contact with the side wings 8 and 9, but it also forms a retainer for the backing strip 17 which in turn distributes a yieldable clamping tension to the glass between the wings 8 and 9 and the backing plates.

In this respect the wings 8 and 9 co-operate also in this cushioning effect so that the glass is confined between a compound arch.

The yieldable construction developed by the assembly serves to compensate for wind pressures and otherwise improve the construction of a device of this kind.

Obviously those skilled in the art may make various changes in the details and arrangement of parts without departing from the spirit of the invention defined by the claims hereto annexed, and it is therefore desired not to be restricted to the precise construction herein disclosed.

I claim:

1. In a device of the class described, a center strip having an outer face portion and tubular marginal portions, side wings for bracing glass panes from one side, said wings having marginal tubular portions swivelingly engaging the external surface of the tubular portions of the center strip, means at the outer extremities of the wings for holding said wings to their work, means for bracing the glass from the opposite side, and means for holding said parts assembled.

2. In a device of the class described, a center strip having an outer face portion and tubular marginal portions, side wings for bracing the panes of window glass from one side, said wings having tubular marginal portions swivelingly engaging the external surface of the tubular marginal portions of the center strip, means at the outer margin of the wings for holding said wings to their work in fixed angular relation with respect to the center strip, means for bracing the glass from the opposite side, and means for holding said parts assembled.

3. In a device of the class described, a curved center strip having an outer face portion and hingedly connected side strips for bracing glass panes from one side, said side strips swivelingly engaging the external surfaces of the center strip margins, said side strips having recesses, a draw plate formed to straddle the center strip with its ends confined in the recesses in the side strips for holding the side strips to their work, means for bracing the glass panes from the opposite side, and a detachable bolt on the draw plate for holding the parts assembled.

4. In a device of the class described, a center strip having hingedly connected side strips for bracing glass panes from one side, recesses in the side strips, a draw plate formed to straddle the center strip with its ends confined in the recesses in the side strips for holding the side strips to their work, said draw plate having a squared opening for the reception of a bolt, a squared portion on said bolt corresponding with the opening in the draw plate and means connected by said bolt for bracing the glass panes from the side opposite the center strip.

5. In a device of the class described, a center strip having an outer face portion and wing strips for bracing panes of glass from one side, interfitting tubular members on the center strip, the external surfaces of which swivelingly engage the internal surface of tubular portions on the wing strips providing a waterproof hinging connection for the wing strips, means at their outer ends for holding the wing strips to their work, means for bracing the glass from the opposite side and means for holding the parts assembled.

6. In a device of the class described, a center strip having an outer face portion and hingedly connected wing strips, the material of the wing strips being folded back upon itself at the respective outer ends thereof to provide recesses, the inner ends thereof having a tubular form for swivelingly engaging the external surfaces of the center strip margins, a draw plate arranged to straddle the center strip with its ends seated in said recesses, a detachable bolt for the draw plate and means connected by said bolt for bracing the glass panes from the side opposite the center strip.

7. In a device of the class described, a center strip having hingedly connected side strips for bracing glass panes from one side, means at their outer ends for holding said wings to their work, and means for bracing the glass from the opposite side, comprising a backing plate arranged to bear against the panes, a bracing strip having an interlocking engagement with the ends of the backing plate and a bolt on said draw plate passing through the backing plate and bracing strip.

8. In a device of the class described, a center strip having angularly adjustable side strips for bracing panes of window glass from one side, a draw plate for holding said strips to their work in fixed angular relation to the center strip, and means for bracing the glass from the opposite side, comprising a backing plate having inwardly turned ends, a bracing strip having inwardly turned longitudinal edges adapted to spring into interlocking engagement with the ends of the backing plate, and means for holding said parts assembled.

9. In a device of the class described, a center strip having angularly adjustable side strips for bracing panes of window glass from one side, a draw plate for holding said strips to their work in fixed angular relation to the center strip, and means for bracing the glass from the opposite side, comprising a backing plate having inwardly turned ends, a bracing strip having inwardly turned longitudinal edges adapted to spring into interlocking engagement with the ends of the backing plate, and means for holding said parts assembled comprising a bolt connecting the draw plate and bracing strip.

10. In a device of the class described, a center strip having angularly adjustable side strips for bracing panes of window glass from one side, a draw plate for holding said strips to their work in fixed angular relation to the center strip, and means for bracing the glass from the opposite side, comprising a backing plate having inwardly turned ends, a bracing strip having inwardly turned longitudinal edges adapted to spring into interlocking engagement with the ends of the backing plate, and means for holding said parts assembled comprising a square headed bolt seated in a square opening in the draw plate and passing through the backing plate and bracing strip.

11. In a device of the class described, a center strip having angularly adjustable wing strips in tubular hinged connection therewith for bracing panes of window glass from one side, means for holding the wing strips to their work, and means for bracing the glass from the opposite side, comprising a backing plate, a channel like bracing strip arranged to interlock with the backing plate, and means for holding the parts assembled under tension.

12. In a device of the class described, a center strip having angularly adjustable wing strips in tubular hinged connection therewith for bracing panes of window glass from one side, means at the outer ends for holding the wing strips to their work, means for bracing the glass from the opposite side, comprising a backing plate, a channel-like bracing strip arranged to interlock with the backing plate, means for holding the parts assembled under tension comprising a draw plate connected with the wing strips of the center strip, and a bolt on said draw plate projecting through the backing plate and bracing strip, whereby the turning of a nut on the projecting end of the bolt will draw the parts on opposite sides of the glass toward each other against the glass and also impart a spreading effect to the bracing strip.

13. The combination as set forth in claim 12 and in which the center strip has an outer face portion and the wing strips have interfitting tubular members; whereby a hinging effect is afforded for the wing strips with a waterproof connection provided thereby.

14. In a device of the class described, a center strip having an outer face portion, wing strips for the center strip, said center strip and wing strips having interfitting tubular members affording a waterproof hinging connection for the wing strips and means for holding the wing strips in embracing relation with panes of window glass.

In witness whereof, I have hereunto subscribed my name.

HARRY A. OLSSON.